(No Model.)

G. ALLEN.
CULTIVATOR.

No. 269,987.    Patented Jan. 2, 1883.

WITNESSES:
Otto Beyer
C. Sedgwick

INVENTOR:
G. Allen
BY Munn & Co
ATTORNEYS.

UNITED STATES PATENT OFFICE.

GEORGE ALLEN, OF NEW-BERNE, NORTH CAROLINA.

CULTIVATOR.

SPECIFICATION forming part of Letters Patent No. 269,987, dated January 2, 1883.

Application filed May 8, 1882. (No model.)

*To all whom it may concern:*

Be it known that I, GEORGE ALLEN, of New-Berne, in the county of Craven and State of North Carolina, have invented a new and Improved Cultivator, of which the following is a full, clear, and exact description.

My invention consists of a cultivator adapted for cultivating both sides of the rows of plants at once, made by the application to the rear end of an ordinary expanding and contracting harrow of a set of cultivator-teeth for each side of the row, with a space between the two sets of teeth, together with an adjustable draft-rod allowing the horse to draw obliquely to the cultivator, so that it will run along the rows while the horse travels between them, as hereinafter fully described.

Reference is to be had to the accompanying drawings, forming part of this specification, in which similar letters of reference indicate corresponding parts in both figures.

Figure 1:
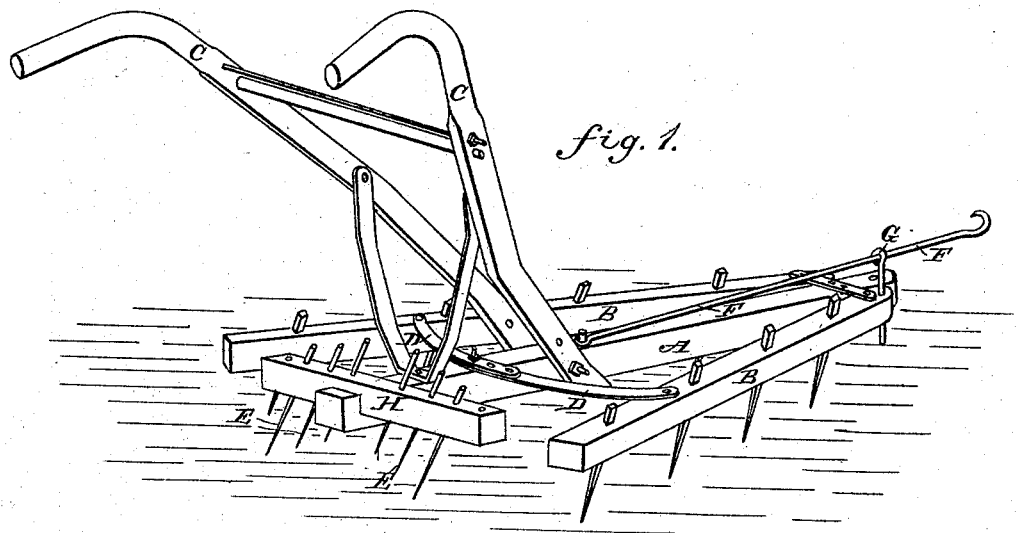
Figure 2:
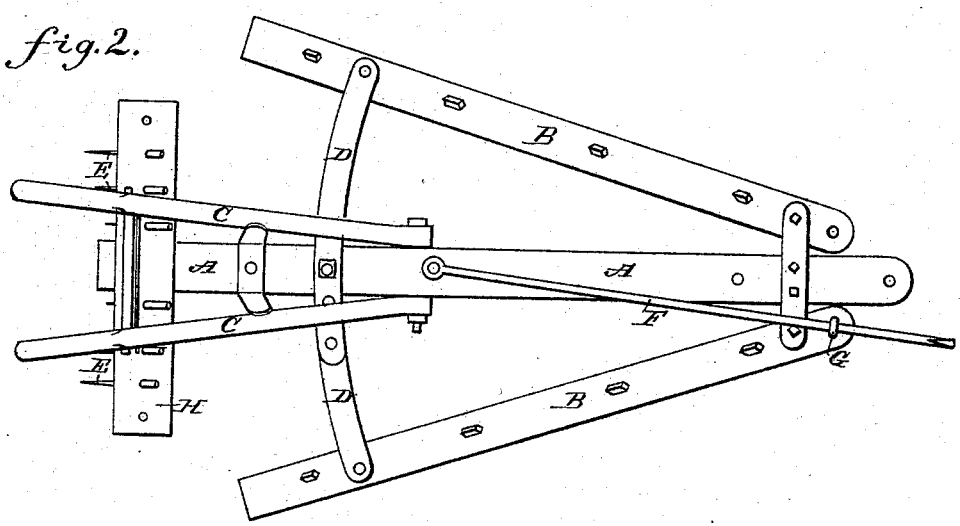

Figure 1 is a perspective view of my improved cultivator, and Fig. 2 is a plan view.

I take an ordinary expanding and contracting Λ-shaped harrow consisting of middle beam, A, without teeth, toothed side beams, B, and handles C, said side beams being adjustable toward and from middle beam, A, by the curved studs D, and to the rear end of said middle beam I attach in any approved way two sets, E, of cultivator-teeth, placing them on the sides of the said beam A, respectively, with sufficient space between said sets of teeth for passing along the rows of plants without injuring them, and together therewith I apply the adjustable draft-rod F for hitching the horse so as to draw obliquely to the cultivator, whereby it may run astraddle of the row, while the horse goes along one side, the said rod being adapted to be set either side of the center for drawing either to right or left hand by means of an eyebolt, G, that may be set in either one of the side beams, B, as may be preferred.

For attaching the cultivator-teeth E, I prefer to employ a short beam, H, which I place crosswise on the beam A, a little in advance of its rear end, and fasten in any approved way, the said beam H being attached at its middle to said beam A, and carrying a like number of teeth E on each side of said beam A. I prefer to set the innermost teeth E so as to run lightly in the ground next to the plants to prevent injury to the roots, and from the inner ones outward to set them so as to increase the effect in the soil.

The cross-beam H may be attached so as to be readily taken off with the cultivator-teeth E to leave the harrow in the ordinary condition for use as such, so that by the mere addition of this simple attachment to the ordinary harrow it is readily converted into a straddle-row cultivator, and by taking it off is as readily converted into a harrow again.

I am aware that harrow-teeth have been attached to cross-beams forming self-adjusting wings to operate each side of the track of the harrow, that harrow-teeth have been attached to a beam rigidly tying the side bars of a harrow, and that the draw-bars of harrows have been made laterally adjustable at their forward ends, and I do not claim such as my invention; but What I wish to secure by Letters Patent is—

The combination, with the central bar, A, and the adjustable side bars, B, carrying teeth, of the cross-bar H, rigidly secured to the beam A, provided with the slanting teeth E, the draft-bar F, and the eyebolt G, arranged to be set in holes in either of the beams B A B, as shown and described.

GEORGE ALLEN.

Witnesses:
L. S. WOOD,
J. L. H. MISSILLIER.